(12) United States Patent
Pang et al.

(10) Patent No.: US 11,214,581 B2
(45) Date of Patent: Jan. 4, 2022

(54) METHOD FOR PREPARING CRISABOROLE

(71) Applicant: Jiangxi Synergy Pharmaceutical Co., Ltd, Jiangxi (CN)

(72) Inventors: Zhengwei Pang, Fengxin (CN); Siming Ye, Fengxin (CN); Yang Liu, Fengxin (CN); Weiping Huang, Fengxin (CN); Liyong Zhou, Fengxin (CN); Yujie Feng, Fengxin (CN)

(73) Assignee: JIANGXI SYNERGY PHARMACEUTICAL CO., LTD, Jiangxi (CN)

( * ) Notice: Subject to any disclaimer, the term of this patent is extended or adjusted under 35 U.S.C. 154(b) by 0 days.

(21) Appl. No.: 17/000,072

(22) Filed: Aug. 21, 2020

(65) Prior Publication Data
US 2021/0053995 A1 Feb. 25, 2021

(30) Foreign Application Priority Data

Aug. 22, 2019 (CN) .......................... 201910777198.7

(51) Int. Cl.
*C07F 5/02* (2006.01)
(52) U.S. Cl.
CPC ................ *C07F 5/025* (2013.01); *C07F 5/02* (2013.01)
(58) Field of Classification Search
CPC ...................................................... C07F 5/025
See application file for complete search history.

(56) References Cited

U.S. PATENT DOCUMENTS

2020/0172560 A1* 6/2020 Bhirud .................... C07F 5/025

FOREIGN PATENT DOCUMENTS

WO WO2007095638 A2 8/2007
WO WO2018115362 A1 6/2018

* cited by examiner

*Primary Examiner* — Rosalynd A Keys
(74) *Attorney, Agent, or Firm* — Lewis Roca Rothgerber Christie, LLP

(57) ABSTRACT

The invention relates to a method for preparing Crisaborole of Formula I, comprising using m-methylphenol as the starting material to obtain a target product through a five-step reaction. The starting materials and the raw materials used in each step of the method according to the present invention are cheap and easy to obtain, and the process is simple. The reaction of introducing boron atoms into the benzene ring to form an oxygen boron heterocycle is novel, with high yield and mild conditions, and is suitable for industrial production.

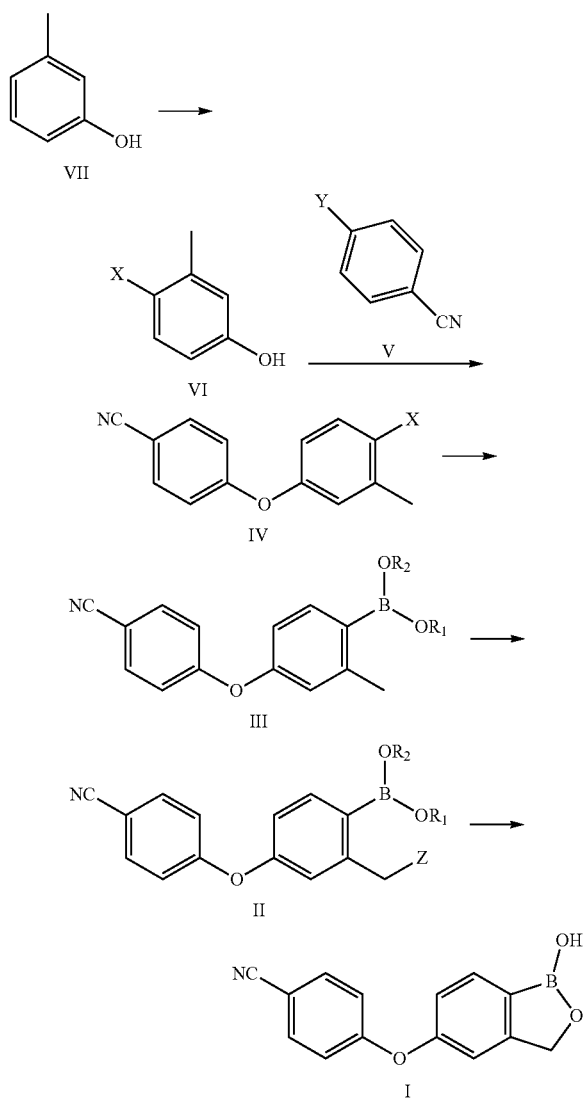

30 Claims, No Drawings

METHOD FOR PREPARING CRISABOROLE

CROSS-REFERENCE TO RELATED APPLICATION(S)

This application claims priority to Chinese Patent Application Number 201910777198.7, filed on Aug. 22, 2019, the entire contents of which is incorporated herein by reference.

TECHNICAL FIELD

The present invention belongs to the field of organic chemistry, and specifically relates to a method for the preparation of a boron-containing heterocyclic compound.

BACKGROUND ART

Crisaborole (CAS: 906673-24-3), with the chemical name of 4-[(1,3-dihydro-1-hydroxy-2,1-benzoxaborol-5-yl)oxy] benzonitrile, has a structure shown in the following Formula I:

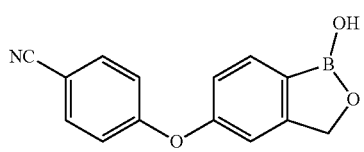

The compound is a phosphodiesterase 4 (PDE-4) inhibitor developed by Anacor Pharmaceuticals, Inc. (acquired by Pfizer in 2016), and its 2% topical ointment was approved by the US FDA in December 2016 with a trade name of Eucrisa for the treatment of moderate to severe eczema (atopic dermatitis) in adults and children who are at least 2 years old. At the time of approval, the drug was the first new molecular entity drug approved by the FDA for the treatment of atopic dermatitis in the past 15 years. It not only has a definite clinical efficacy, but also has good long-term safety and tolerability. Therefore, the topical ointment of Crisaborole provides a very important non-steroidal replacement therapy for the patients suffering from atopic dermatitis (eczema).

One key difficulty in the preparation of Crisaborole lies in the synthesis of benzoxaboroxane. The synthetic routes that have been reported in the prior art are mainly as follows:

Route 1: The halogen atom on the benzene ring and the protected or unprotected ortho-hydroxymethyl are reacted with the borate and then cyclized. For example, the Chinese patent application with a publication number of CN101914109A discloses a preparation method of Crisaborole, and its synthetic route is as follows:

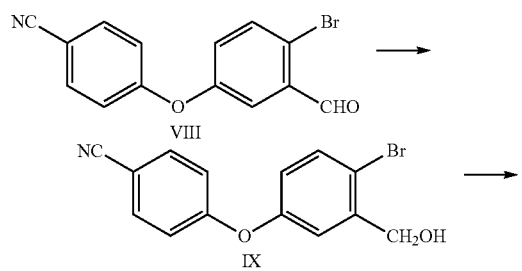

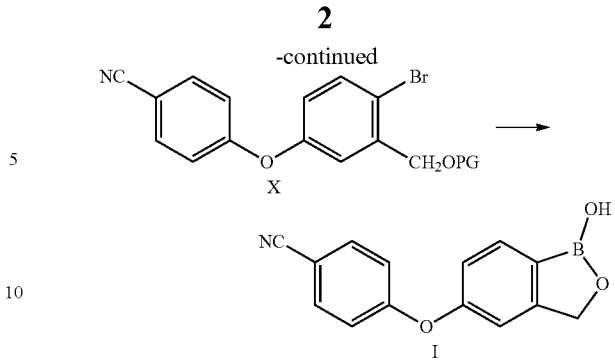

wherein PG is a hydroxyl protecting group.

The compound having the above structural Formula X is subjected to a metallation reaction with butyl lithium in tetrahydrofuran at −78° C., and then trimethyl borate is added for boronation reaction. However, due to the ultra-low temperature of −78° C., harsh reaction conditions and high equipment requirements, this method is not suitable for industrial production. In addition, in the above preparation process, multiple steps require passing through the chromatographic column many times, therefore, the operation is cumbersome, the yield is low, and the total yield is only 33%.

The method for preparing Crisaborole disclosed in the Chinese patent application with a publication number of CN107759625A also belongs to Route 1: the compound of structural Formula XI was used as the starting material, and reacted with borate at the temperature below −78° C. in the presence of a strong base to give boric acid intermediate which continued to cyclize without separation to give Crisaborole in "one-pot" way. The synthetic route is shown as follows:

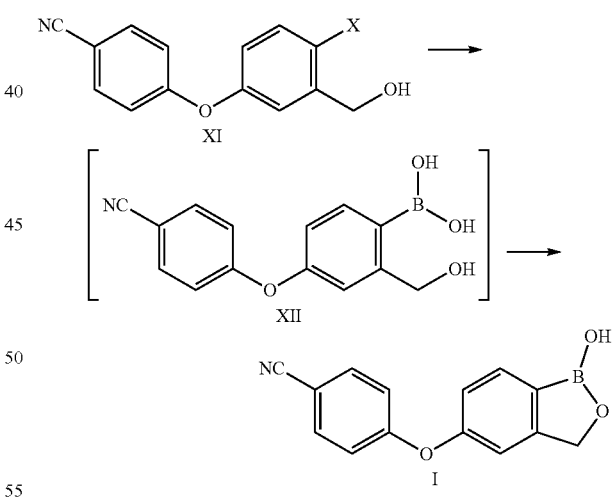

wherein X is Cl, Br or I.

Although this method does not need to protect the hydroxyl group, it still needs to be reacted at an ultra-low temperature and needs to use an excessive amount of butyl lithium, which is not conducive to industrial production.

Route 2: The ortho diazo-substituted hydroxymethyl benzene compound was used as the key intermediate and cyclized with borides. For example, the invention patent application with a publication number of WO2018150327A1 disclosed that 4-(4-amino-3-(hydroxymethyl)-phenoxy)benzonitrile of Formula XIII was used as the starting material to obtain the diazonium salt of Formula XV which reacted with borides to obtain Crisaborole of Formula I. The synthetic route is shown as below:

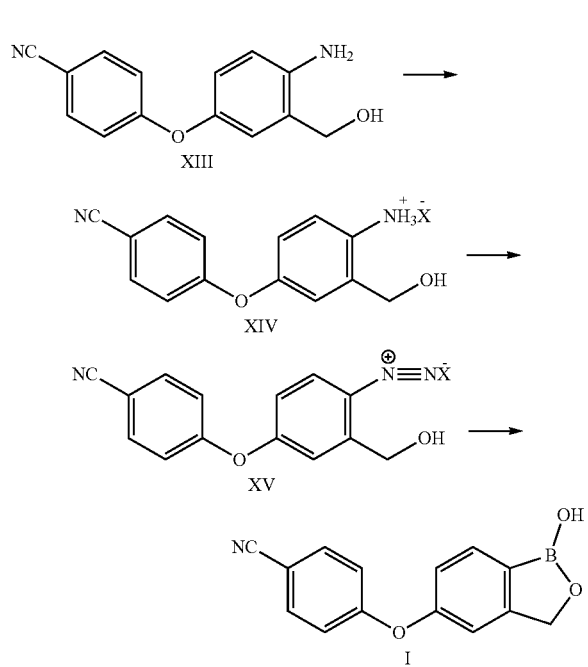

wherein, X is Cl, Br or I.

The diazotization reaction in the method is a dangerous process, and is not conducive to safe production. Meanwhile, the diazonium salt itself and its degradation impurities are genotoxic impurities, which will bring safety risks to long-term administration.

Therefore, it is necessary to develop a method for preparing Crisaborole, which has milder reaction conditions, easier operation, lower cost, and is more conducive to drug safety.

Technical Solution

In order to overcome the deficiencies of the prior art, the present invention provides a new method for preparing Crisaborole. Compared with the prior art, the preparing method of the present invention has the advantages of mild reaction conditions, high yield, good product quality and low production cost, which is particularly suitable for large-scale industrial production.

Provided herein is a method for preparing Crisaborole of Formula I:

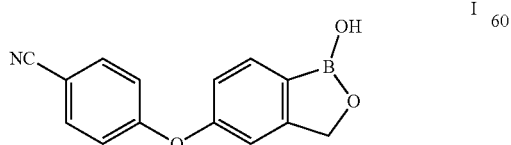

comprising the steps of:

Step 1, contacting m-methylphenol of Formula VII

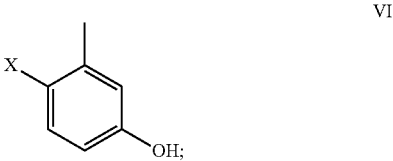

with a halogenating reagent in organic solvent A to give 4-halo-3-methylphenol of Formula VI

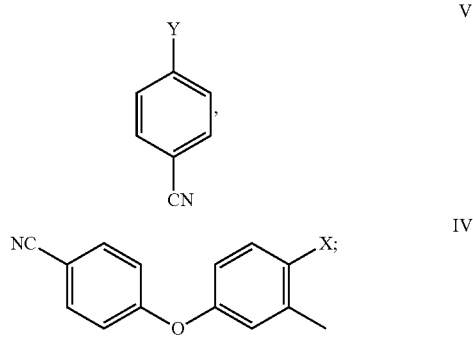

Step 2, coupling 4-halo-3-methylphenol obtained in Step 1 with 4-halo-benzonitrile of Formula V in organic solvent B under alkaline conditions to give 4-(4-halo-3-methylphenoxy)benzonitrile of Formula IV

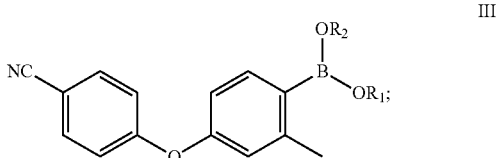

Step 3, subjecting 4-(4-halo-3-methylphenoxy)benzonitrile obtained in Step 2 to a halogen-metal exchange reaction in organic solvent C, and then to a reaction with a borate to give 4-(4-cyano-phenoxy)-2-methylphenylboronic acid or ester thereof of Formula III; or contacting 4-(4-halo-3-methylphenoxy) benzonitrile obtained in Step 2 with a borate in organic solvent D under alkaline condition to give 4-(4-cyano-phenoxy)-2-methylphenylboronic acid or ester thereof of Formula III via a metal-catalyzed reaction Step 4, contacting 4-(4-cyano-phenoxy)-2-methylphenylboronic acid or ester thereof obtained in Step 3 with a halogenating reagent in organic solvent E to give 4-(4-cyano-phenoxy)-2-halomethylphenylboronic acid or ester thereof of Formula II

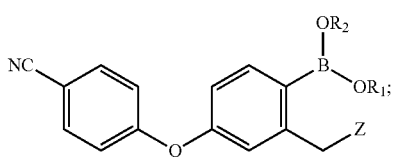

II

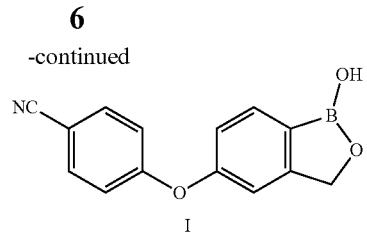

I

Step 5, subjecting 4-(4-cyano-phenoxy)-2-halomethylphenyl-boronic acid or ester thereof obtained in Step 4 to a closing ring reaction under alkaline condition to give Crisaborole;

wherein, X and Z are each independently selected from Cl, Br and I; Y is selected from F, Cl, Br and I; $R_1$ and $R_2$ are each independently selected from H and $C_1$~$C_6$ alkyl, or $R_1$ and $R_2$ form a substituted or unsubstituted five-membered or six-membered saturated or unsaturated heterocycle with O and B to which they are attached respectively.

Preferably, $R_1$=$R_2$=H or $C_1$~$C_4$ linear or branched alkyl; or $R_1$ and $R_2$ form a substituted or unsubstituted five-membered or six-membered saturated heterocycle with O and B to which they are attached respectively. More preferably, $R_1$ and $R_2$ form a substituted or unsubstituted five membered saturated heterocycle with O and B to which they are attached respectively. Further preferably, $R_1$ and $R_2$ form a $C_1$~$C_3$ alkyl-substituted five membered saturated heterocycle with O and B to which they are attached respectively.

The synthetic route of Crisaborole according to the present invention is as follows:

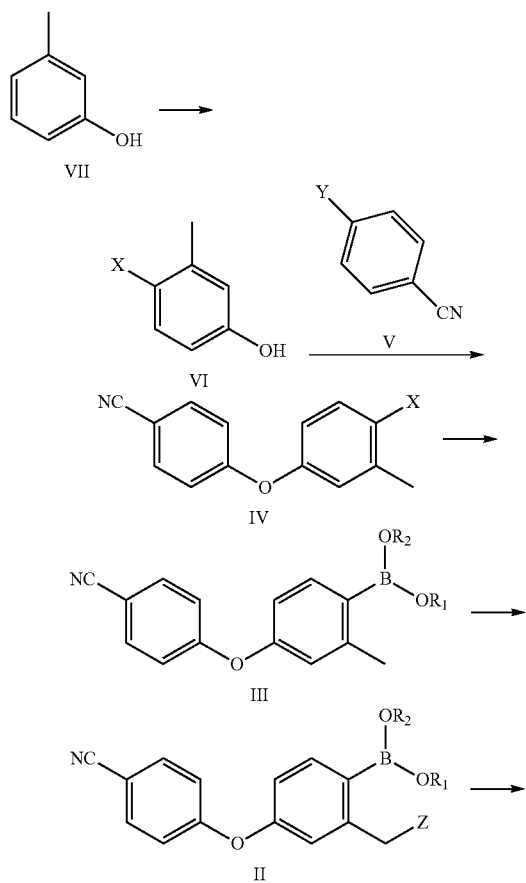

wherein, X and Z are each independently selected from Cl, Br and I; Y is selected from F, Cl, Br and I; R, and $R_2$ are each independently selected from H and $C_1$~$C_6$ alkyl, or R, and $R_2$ form a substituted or unsubstituted five or six membered saturated or unsaturated heterocycle with O and B to which they are attached respectively.

Preferably, in the Step 1, the halogenating reagent is one or more selected from the group consisting of $HBr/H_2O_2$, $HBr/R_3SOR_4$, N-bromosuccinimide (NBS), N-chlorosuccinimide (NCS), N-iodosuccinimide (NIS), dibromoisocyanuric acid, 1,3-dichloro-5,5-dimethylhydantoin, 1,3-dibromo-5,5-dimethylhydantoin, bromine and iodine; more preferably, the halogenating reagent is one selected from the group consisting of $HBr/H_2O_2$, $HBr/R_3SOR_4$, N-iodosuccinimide (NIS) and 1,3-dibromo-5,5-dimethylhydantoin; most preferably, the halogenation reagent is $HBr/R_3SOR_4$ or N-iodosuccinimide (NIS); wherein, $R_3$ and $R_4$ are each independently selected from $C_1$~$C_6$ alkyl, aryl and benzyl; preferably, $R_3$ and $R_4$ are both methyl.

Preferably, in the Step 1, the molar ratio of the halogenating reagent to m-methylphenol is 0.5:1~4:1, more preferably 1:1~2:1.

Preferably, in the Step 1, the reaction is carried out in the presence or absence of an acid.

Preferably, the acid is an organic acid or an inorganic acid; the organic acid is one or more selected from the group consisting of acetic acid, trifluoromethanesulfonic acid, methanesulfonic acid, p-toluenesulfonic acid and trifluoroacetic acid; and the inorganic acid is one or more selected from the group consisting of hydrochloric acid, sulfuric acid and hydrobromic acid.

More preferably, the acid is p-toluenesulfonic acid or sulfuric acid.

Preferably, in the Step 1, the reaction temperature is −10° C.~80° C., more preferably −5° C.~70° C.

Preferably, in the Step 1, the organic solvent A is one or more selected from the group consisting of ethyl acetate, dichloromethane, trichloromethane, carbon tetrachloride, nitromethane, tetrahydrofuran, chlorobenzene, 1,4-dioxane and acetonitrile. More preferably, the organic solvent A is one selected from the group consisting of ethyl acetate, acetonitrile, dichloromethane and trichloromethane. Most preferably, the organic solvent A is ethyl acetate or acetonitrile.

Preferably, in the Step 2, the organic solvent B is one or more selected from polar aprotic solvents (such as DMF, DMSO, NMP (N-methyl-2-pyrrolidone), sulfolane and acetonitrile), aromatic hydrocarbon solvents (such as toluene and xylene), ketone solvents (such as acetone, methyl ethyl ketone and methyl isobutyl ketone), ester solvents (such as ethyl acetate, butyl acetate and isopropyl acetate) and ether solvents (such as tetrahydrofuran, methyl tert-butyl ether and 1,4-dioxane).

More preferably, the organic solvent B is DMF or DMSO.

Preferably, in the Step 2, the alkaline conditions refer to the presence of an inorganic base or an organic base.

Preferably, the inorganic base is one or more selected from the group consisting of sodium hydroxide, potassium hydroxide, lithium hydroxide, potassium carbonate, potassium bicarbonate, sodium carbonate and sodium bicarbonate. More preferably, the inorganic base is one or more selected from the group consisting of potassium hydroxide, potassium carbonate and potassium bicarbonate. Most preferably, the inorganic base is potassium carbonate or potassium hydroxide.

Preferably, the organic base is one or more selected from the group consisting of triethylamine, diisopropylethylamine, DBU, DABCO, pyrrole, piperidine, tetrabutylammonium fluoride, tetrabutylammonium bromide, tetrabutylammonium chloride and benzyltriethylammonium chloride. More preferably, the organic base is tetrabutylammonium fluoride.

Preferably, in the Step 2, the molar ratio of 4-halo-3-methylphenol to 4-halo-benzonitrile is 0.5:1~1:4, more preferably 1:1~1:2.

Preferably, the reaction temperature in the Step 2 is 50° C.~130° C., more preferably 100° C.~130° C.

Preferably, the Step 3 is carried out under the protection of an inert gas.

Preferably, in the Step 3, the molar ratio of 4-(4-halo-3-methylphenoxy) benzonitrile to the borate is 1:0.6~1:4, more preferably 1:1.2~1:2.

Preferably, in the Step 3, the halogen-metal exchange reaction is carried out in the presence of a meatal Grignard reagent.

Preferably, the metal Grignard reagent is one selected from the group consisting of isopropyl magnesium chloride, isopropyl magnesium bromide, isopropyl magnesium chloride lithium chloride complex and isopropyl magnesium bromide lithium chloride complex. More preferably, the metal Grignard reagent is isopropyl magnesium chloride or isopropyl magnesium bromide lithium chloride complex.

Preferably, the molar ratio of 4-(4-halo-3-methylphenoxy) benzonitrile to the metal Grignard reagent is 1:0.6~1:4, more preferably 1:1.5~1:3.

Preferably, the reaction temperature in the halogen-metal exchange reaction is −40° C. to room temperature, more preferably −30° C.~0° C.

Preferably, the reaction solvent C is selected from ether solvents or hydrocarbon solvents; wherein, the ether solvent is one or more selected from the group consisting of ether, tetrahydrofuran, 1,4-dioxane and methyl tert-butyl ether; the hydrocarbon solvent is one or more selected from the group consisting of toluene, xylene, n-hexane, cyclohexane and heptane. More preferably, the reaction solvent C is tetrahydrofuran.

Preferably, in the Step 3, if the halogen-metal exchange reaction is performed, the borate is one or more selected from the group consisting of trimethyl borate, triethyl borate, triisopropyl borate, tributyl borate, triisobutyl borate, tripentyl borate and bis(pinacolato)diboron. More preferably the borate is triisopropyl borate or triethyl borate.

Preferably, in the Step 3, the metal-catalyzed reaction is carried out in the presence of a palladium-containing metal catalyst.

More preferably, the palladium-containing metal catalyst is $Pd(PPh_3)_4$ or $Pd_2(dba)_3$.

In some embodiments, the palladium-containing metal catalyst may be composed of a palladium precursor and a phosphine ligand; the palladium precursor is one selected from the group consisting of $PdCl_2$, $PdBr_2$, $PdI_2$, $Pd(OAc)_2$ and allylpalladium chloride dimer; the phosphine ligand is one selected from the group consisting of $PPh_3$, $P(tBu)_3$, $PCy_3$, Xant Phos, DPPB, DPPP, DPPHex and DPPF and other monophosphine ligands or diphosphine ligands. More preferably, the palladium precursor is $PdCl_2$, and the phosphine ligand is DPPF.

Preferably, the molar ratio of 4-(4-halo-3-methylphenoxy)benzonitrile to the metal catalyst is 1:0.002~1:0.05, more preferably 1:0.005~1:0.02.

Preferably, the base in the metal-catalyzed reaction is selected from an organic base and an inorganic base.

Preferably, the organic base is one or more selected from the group consisting of triethylamine, N,N-diisopropylethylamine, DBU, DABCO, pyrrole and piperidine.

Preferably, the inorganic base is one or more selected from the group consisting of sodium hydroxide, potassium hydroxide, lithium hydroxide, potassium carbonate, potassium bicarbonate, potassium acetate, sodium carbonate, sodium bicarbonate, $R_5OLi$, $R_5ONa$ and $R_5OK$, wherein $R_5$ is $C_1$~$C_5$ alkyl.

More preferably, the base is potassium acetate.

Preferably, the solvent D in the metal-catalyzed reaction is one or more selected from the group consisting of polar aprotic solvents (such as DMF, DMSO, sulfolane and acetonitrile), aromatic hydrocarbon solvents (such as toluene and xylene), ketone solvents (such as acetone, methyl ethyl ketone and methyl isobutyl ketone), ester solvents (such as ethyl acetate, butyl acetate and isopropyl acetate) and ether solvents (such as tetrahydrofuran, 1,4-dioxane and methyl tert-butyl ether). More preferably, the solvent D is 1,4-dioxane.

Preferably, the reaction temperature in the metal-catalyzed reaction is 80° C.~120° C., more preferably 100° C.~110° C.

Preferably, in the Step 3, if the metal-catalyzed reaction is performed, the borate is a bis(pinacolato)diboron.

Preferably, the Step 4 is carried out under illumination conditions or in the presence of an initiator.

Preferably, the illumination condition is a xenon lamp, a deuterium lamp, a mercury lamp, an ultraviolet lamp, a carbon arc lamp or a fluorescent lamp as the light source. More preferably, the illumination condition is a xenon lamp as the light source.

Preferably, the initiator is one selected from the group consisting of benzoyl peroxide, di-tert-butyl peroxide, tert-butyl hydroperoxide, azobisisobutyronitrile and 1,2-dibromoethane. More preferably, the initiator is azobisisobutyronitrile.

More preferably, the Step 4 is carried out in the presence of the initiator under the protection of an inert gas.

Preferably, in the Step 4, the halogenating reagent is one or more selected from the group consisting of N-bromosuccinimide (NBS), N-chlorosuccinimide (NCS), N-iodosuccinide (NIS), dibromoisocyanuric acid, 1,3-dichloro-5,5-dimethylhydantoin, 1,3-dibromo-5,5-dimethylhydantoin, chlorine, bromine and iodine. More preferably, the halogenating agent is N-bromosuccinimide (NBS) or 1,3-dibromo-5,5-dimethylhydantoin.

Preferably, in the Step 4, the molar ratio of 4-(4-cyanophenoxy)-2-methylphenylboronic acid to the halogenating reagent is 1:0.6~1:4, more preferably 1:1.2~1:2.

Preferably, in the Step 4, the organic solvent E is one or more selected from the group consisting of dichloromethane, trichloromethane, carbon tetrachloride, nitromethane, tetrahydrofuran, chlorobenzene, 1,4-dioxane and acetonitrile. More preferably, the organic solvent E is chlorobenzene.

Preferably, in the Step 4, the reaction temperature is 50° C.~100° C., more preferably 60° C.~80° C.

Preferably, in the Step 5, the alkaline condition is in the presence of an inorganic base or an organic base.

Preferably, the inorganic base is one or more selected from the group consisting of sodium hydroxide, potassium hydroxide, lithium hydroxide, potassium carbonate, potassium bicarbonate, sodium carbonate and sodium bicarbonate. More preferably, the inorganic base is potassium hydroxide or sodium hydroxide.

Preferably, the organic base is one or more selected from the group consisting of diethylamine, triethylamine, diisopropylethylamine, pyridine, dimethylaminopyridine, monoethanolamine, diethanolamine and morpholine. More preferably, the organic base is triethylamine.

Preferably, in the Step 5, the reaction temperature is 30° C.~80° C., more preferably 450° C.~65° C.

In the specification of the present invention, the temperature means any temperature value within the range of +5° C. for the specific temperature value. For example, 0° C. means any temperature value within the range of 0±5° C., specifically, it can be −5° C., −4° C., −3° C., −2° C., −1° C., 0° C., 1° C., 2° C., 3° C., 4° C. or 5° C.

In the method for preparing Crisaborole provided herein, the product of each step does not need to be purified by column chromatography, but only by recrystallization, or is used directly in the next step without purification.

Compared with the prior art, the method for preparing Crisaborole provided herein has the following beneficial effects:

1. The starting materials and the raw materials used in each step are cheap and easily available, and expensive reagents and materials in the prior art are not used.

2. The reaction of introducing boron atoms into the benzene ring to form an oxygen boron heterocycle is novel, with high yield, mild reaction conditions and no dangerous process, which avoids the ultra-low temperature reaction in the prior art and various toxic impurities that may be introduced. Thus, the safety of production and clinical medication are improved.

3. The reaction time of each step is short. The product does not need to be purified by column chromatography. Therefore, the process is simple, easy to operate, and suitable for industrial production.

4. The product yield of each step is above 80%, and the purity of the final product is above 99.5%.

DETAILED DESCRIPTION OF PREFERRED EMBODIMENTS

The present invention will be described below with reference to specific examples. Those skilled in the art can understand that these examples are only for illustrating the present invention, and they do not limit the scope of the present invention in any way.

The experimental methods in the following examples are conventional methods unless otherwise specified. The raw materials and reagent materials used in the following examples are all commercially available products unless otherwise specified.

Example 1

Preparation of 4-iodo-3-methyl-phenol (Compound of Formula VI)

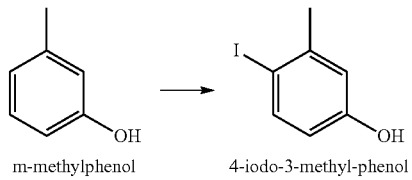

m-methylphenol → 4-iodo-3-methyl-phenol

A flask was charged with 40 g m-methylphenol (0.37 mol), 180 ml acetonitrile and 0.5 g p-toluenesulfonic acid. After cooled to 10° C.~15° C., 92 g NIS (0.41 mol) was added in bateches to the flask under stirring. The temperature of the reaction system was controlled at 10° C.~15° C. After reacting for 12 hours, 50 ml 5% sodium bisulfite aqueous solution was added to the flask, and stirred for 1 hour. The reaction solution was distilled under reduced pressure to remove most of acetonitrile. 100 ml dichloromethane was added to the residue, stirred, and then allowed to separate into layers. The organic layer was concentrated by vacuum distillation. The residue was added into 200 ml water to precipitate light yellow solid. After stirring for 2 hours, filtration and drying yielded 76 g target product with purity of 98.3% and yield of 87.7%.

Mass: m/z 232.8 [M−H]$^+$;

$^1$H NMR (400 MHz, CDCl$_3$) δ 7.62 (d, J=8.4 Hz, 1H), 6.76 (d, J=3.2 Hz, 1H), 6.43 (dd, J$_1$=2.8 Hz, J$_2$=8.4 Hz, 1H), 4.82 (s, 1H), 2.36 (s, 3H).

Example 2

Preparation of 4-bromo-3-methylphenol (Compound of Formula VI)

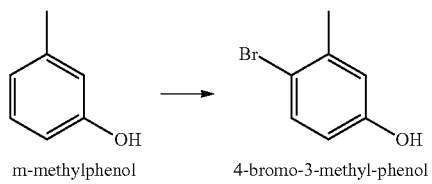

m-methylphenol → 4-bromo-3-methyl-phenol

A flask was charged with 40 g m-methylphenol (0.37 mol) and 200 ml dichloromethane. After cooled to 0° C.~5° C., 169 g 1,3-dibromo-5,5-dimethylhydantoin (0.59 mol) was added in batches to the flask under stirring.

The temperature of the reaction system was controlled at 30° C.~35° C. After reacting for 8 hours, 50 ml 5% sodium bisulfite aqueous solution was added to the flask, and stirred for 1 hour. The reaction solution was distilled under reduced pressure to remove most of dichloromethane. 100 ml dichloromethane was added to the residue, stirred, and allowed to separate into layers. The organic layer was concentrated under reduced pressure. The residue was added into 200 ml water to precipitate light yellow solid. After stirring for 2 hours, filtration and drying yielded 57 g target product with purity of 97% and yield of 83%.

Mass: m/z 184.9 [M−H]+;
$^{1}$H NMR (400 MHz, CDCl$_{3}$) δ 7.60 (d, J=8.4 Hz, 1H), 6.72 (d, J=3.2 Hz, 1H), 6.41 (dd, J$_{1}$=2.8 Hz, J$_{2}$=8.4 Hz, 1H), 4.80 (s, 1H), 2.34 (s, 3H).

Example 3

Preparation of 4-bromo-3-methylphenol (Compound of Formula VI)

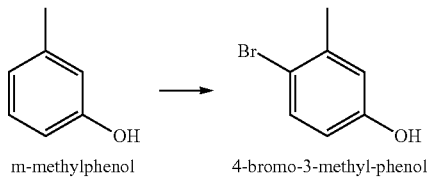

m-methylphenol        4-bromo-3-methyl-phenol

A flask was charged with 40 g m-methylphenol (0.37 mol), 200 ml ethyl acetate, 39 g hydrobromic acid (0.48 mol) and 37 g dimethyl sulfoxide (0.48 mol). The system was stirred, heated to 60° C.~65° C. and reacted at the temperature for 3 hours. After cooled to room temperature, 200 ml 10% sodium bisulfite aqueous solution was added to the flask, and then allowed to separate into layers. The organic layer was concentrated under reduced pressure. The residue was added into 200 ml water to precipitate light yellow solid. After stirring for 2 hours, filtration and drying yielded 62 g target product with purity of 98% and yield of 90%.

Mass: m/z 184.9 [M−H]+;
$^{1}$H NMR (400 MHz, CDCl$_{3}$) δ 7.60 (d, J=8.4 Hz, 1H), 6.72 (d, J=3.2 Hz, 1H), 6.41 (dd, J$_{1}$=2.8 Hz, J$_{2}$=8.4 Hz, 1H), 4.80 (s, 1H), 2.34 (s, 3H).

Example 4

Preparation of 4-(4-iodo-3-methylphenoxy)benzonitrile (Compound of Formula IV)

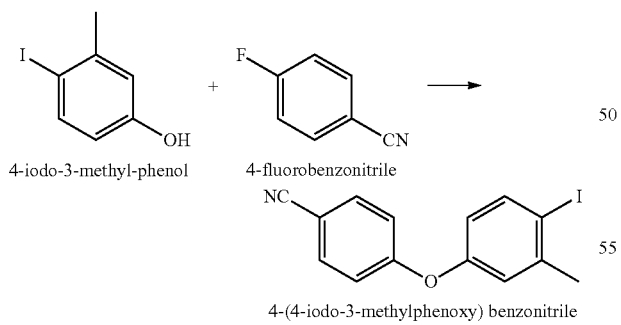

4-iodo-3-methyl-phenol        4-fluorobenzonitrile 4-(4-iodo-3-methylphenoxy) benzonitrile A flask was sequentially charged with 76 g 4-iodo-3-methyl-phenol (0.32 mol) prepared in Example 1, 46 g 4-fluorobenzonitrile (0.38 mol), 350 ml DMF and 50 g potassium carbonate. The system was heated to 100° C. and reacted at the temperature for 8 hours. After cooled to room temperature, the reaction solution was added to 800 ml water, stirred for 1 hour, and then filtrated. The filter cake was stirred with 300 ml ethanol. Filtration under reduced pressure and drying yielded target product (92 g, white solid) with purity of 99% and yield of 85%.

Mass: m/z 333.9 [M−H]+,
$^{1}$H NMR (400 MHz, CDCl$_{3}$) δ 7.82 (d, 0.1=8.4 Hz, 1H), 7.62-7.59 (m, 2H), 7.02-6.96 (m, 3H), 6.64 (dd, J$_{1}$=2.8 Hz, J$_{2}$=8.8 Hz, 1H), 2.42 (s, 3H).

Example 5

Preparation of 4-(4-iodo-3-methylphenoxy)benzonitrile (Compound of Formula IV)

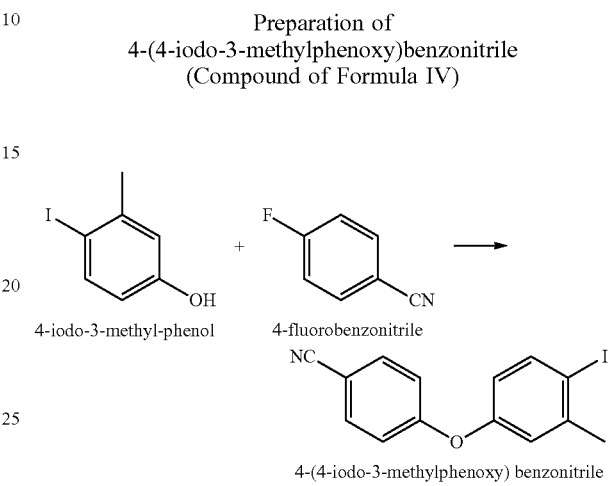

4-iodo-3-methyl-phenol        4-fluorobenzonitrile 4-(4-iodo-3-methylphenoxy) benzonitrile A flask was charged in turn with 46.8 g 4-iodo-3-methyl-phenol (0.2 mol) prepared according to the process described in Example 1, 29 g 4-fluorobenzonitrile (0.24 mol), 300 ml toluene and 300 ml of a solution of tetrabutylammonium fluoride in THF (1 mol/L). The system was heated to 90° C. and reacted at the temperature for 4 hours. When the reaction completed, the reaction solution was cooled to room temperature, added into 300 ml water, stirred for 1 hour, and then allowed to separate into layers. The aqueous layer was extracted with ethyl acetate twice (100 ml×2). The organic layers were combined, dried with anhydrous sodium sulfate, and then distilled to dry. 300 ml n-hexane was added into the residue, and the mixture was stirred in an ice-water bath for 2 hours to precipitate white solid. Filtration under reduced pressure and drying yielded target product (59 g, white solid) with purity of 99% and yield of 88%.

Mass: m/z 333.9 [M−H]+;
$^{1}$H NMR (400 MHz, CDCl$_{3}$) δ 7.82 (d, J=8.4 Hz, 1H), 7.62-7.59 (m, 2H), 7.02-6.96 (m, 3H), 6.64 (dd, J$_{1}$=2.8 Hz, J$_{2}$=8.8 Hz, 1H), 2.42 (s, 3H).

Example 6

Preparation of 4-(4-bromo-3-methylphenoxy)benzonitrile (Compound of Formula IV)

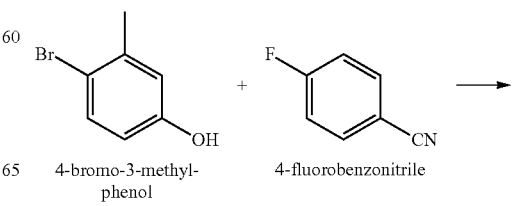

4-bromo-3-methyl-phenol        4-fluorobenzonitrile

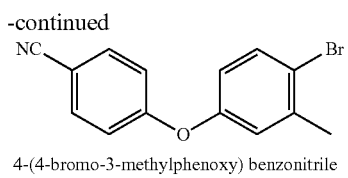

4-(4-bromo-3-methylphenoxy) benzonitrile

A flask was sequentially charged with 57 g 4-bromo-3-methyl-phenol (0.3 mol) prepared in Example 2, 54 g 4-fluorobenzonitrile (0.45 mol), 300 ml DMSO and 13 g potassium hydroxide. The system was heated to 120° C. and reacted at the temperature for 12 hours. After cooled to room temperature, the reaction solution was added into 800 ml water, stirred for 1 hour and filtrated. The filter cake was dissolved with 300 ml dichloromethane. The solution was concentrated under reduced pressure. The residue was recrystallized with a mixed solvent of 180 ml n-heptane and 40 ml ethyl acetate. Filtration and drying yielded target product (79.5 g, white solid) with purity of 99.5% and yield of 85%.

Mass: m/z 288.0 [M–H]$^+$;

$^1$H NMR (400 MHz, CDCl$_3$) δ 7.61 (d, J=7.2 Hz, 2H), 7.54 (d, J=7.2 Hz, 1H), 7.00 (d, J=6.8 Hz, 2H), 6.95 (s, 1H), 6.64 (dd, J=2.0 Hz, J$_2$=6.8 Hz, 1H), 2.39 (s, 3H).

Example 7

Preparation of 4-(4-bromo-3-methylphenoxy)benzonitrile (Compound of Formula IV)

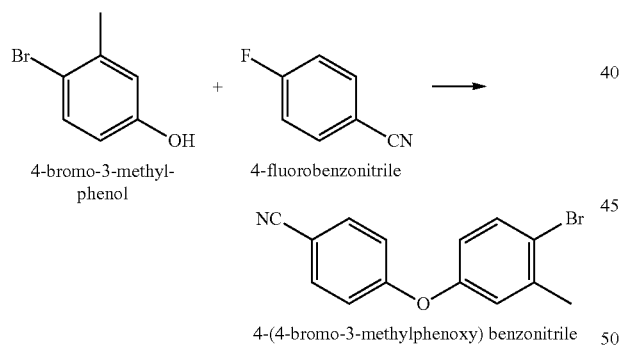

4-bromo-3-methyl-phenol         4-fluorobenzonitrile 4-(4-bromo-3-methylphenoxy) benzonitrile A flask was sequentially charged with 62 g 4-bromo-3-methyl-phenol (0.33 mol) prepared in Example 3, 60 g 4-fluorobenzonitrile (0.5 mol), 350 ml 1,4-dioxane and 13 g potassium hydroxide. The system was heated to 80° C. and reacted at the temperature for 12 hours. After cooled to room temperature, the reaction solution was added into 800 ml water, stirred for 1 hour and filtrated. The filter cake was added into 200 ml 95% ethanol, stirred in an ice-water bath. Filtration and drying yielded target product (84.2 g, white solid) with purity of 99% and yield of 90%.

Mass: m/z 288.0 [M–H]$^+$;

$^1$H NMR (400 MHz, CDCl$_3$) δ 7.61 (d, J=7.2 Hz, 2H), 7.54 (d, J=7.2 Hz, 1H), 7.00 (d, J=6.8 Hz, 2H), 6.95 (s, 1H), 6.64 (dd, J=2.0 Hz, J$_2$=6.8 Hz, 1H), 2.39 (s, 3H).

Example 8

Preparation of 4-(4-cyano-phenoxy)-2-methylphenylboronic acid (Compound of Formula III)

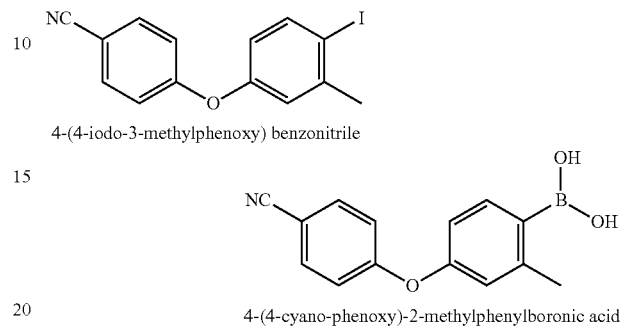

4-(4-iodo-3-methylphenoxy) benzonitrile 4-(4-cyano-phenoxy)-2-methylphenylboronic acid In the atmosphere of nitrogen, a flask was charged with 92 g 4-(4-iodo-3-methylphenoxy)benzonitrile (0.27 mol) prepared in Example 4 and 400 ml tetrahydrofuran. After cooled to −20° C., 270 ml of a solution of isopropylmagnesium chloride in tetrahydrofuran (2 mol/L) was added dropwise. The system reacted at −25° C. for 2 hours. 66 g triisopropyl borate (0.35 ml) was added, and reacted at −25° C. for 2 hours. Then 300 ml water was added, stirred at room temperature for 2 hours and allowed to separate into layers. The organic layer was concentrated under reduced pressure, and the residue was stirred with 300 ml n-hexane. Filtration and drying yielded target product (69 g, light yellow solid) with purity of 95% and yield of 100%.

Mass: m/z 252.0 [M–H]$^+$;

$^1$H NMR (400 MHz, CDCl$_3$) δ 7.85 (d, J=7.2 Hz, 2H), 7.66 (d, J=6.8 Hz, 1H), 7.16 (d, J=7.2 Hz, 2H), 6.91-6.88 (m, 2H), 4.23 (s, 2H), 2.33 (s, 3H).

Example 9

Preparation of diisobutyl 4-(4-cyano-phenoxy)-2-methylphenylborate (Compound of Formula III)

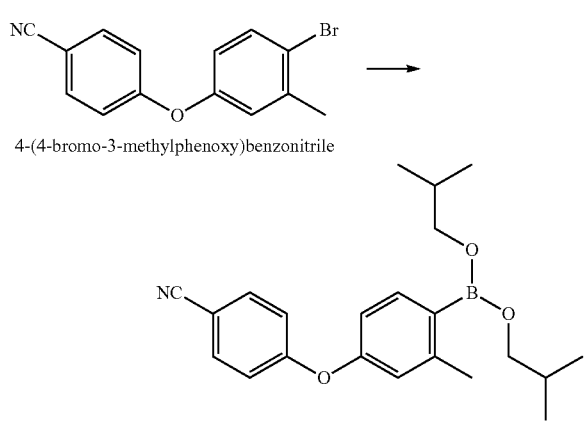

4-(4-bromo-3-methylphenoxy)benzonitrile

Diisobutyl 4-(4-cyano-phenoxy)-2-methylphenylborate

A flask was charged with 74.8 g 4-(4-bromo-3-methylphenoxy)benzonitrile (0.26 mol) prepared in Example 6 and 400 ml tetrahydrofuran. After cooled to below 0° C., 390 ml of a solution of isopropylmagnesium bromide lithium chloride in tetrahydrofuran (2 mol/L) was added dropwise. The system reacted at 0° C. for 2 hours. 78 g triisobutyl borate (0.34 ml) was added, and reacted at 0° C. for 2 hours. Then 200 ml water was added, stirred at room temperature for 2 hours and allowed to separate into layers. The organic layer was concentrated under reduced pressure, and the residue was stirred with 200 ml n-hexane. Filtration and drying yielded target product (95 g, light yellow solid) with purity of 97% and yield of 100%.

Mass: m/z 364.1 [M−H]$^+$;

$^1$H NMR (400 MHz, CDCl$_3$) δ 7.82 (d, J=8.0 Hz, 1H), 7.64-7.53 (m, 2H), 7.12-7.09 (m, 2H), 6.90-6.87 (m, 2H), 3.78 (d, J=4.8 Hz, 4H), 2.34 (s, 3H), 1.35-1.21 (m, 2H), 0.95 (d, J=3.6 Hz, 12H).

Example 10

Preparation of pinacol 4-(4-cyano-phenoxy)-2-methylphenylborate (Compound of Formula III)

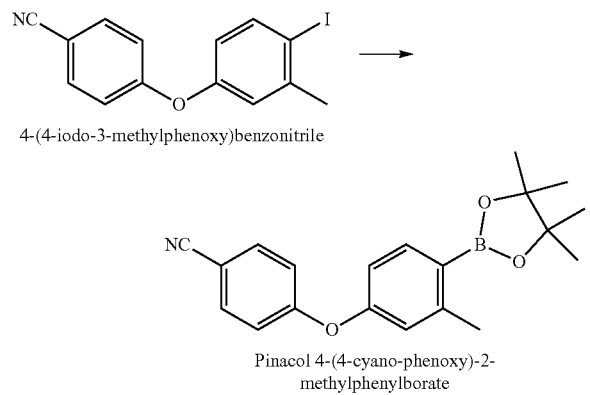

Pinacol 4-(4-cyano-phenoxy)-2-methylphenylborate

In the atmosphere of nitrogen, a flask was charged with 46 g 4-(4-iodo-3-methylphenoxy)benzonitrile (0.135 mol) prepared in Example 5 and 120 ml tetrahydrofuran. After cooled to −25° C., 140 ml of a solution of isopropylmagnesium chloride in tetrahydrofuran (2 mol/L) was added dropwise. The system reacted at −25° C. for 2 hours. 51.4 g bis(pinacolato)diboron (0.20 ml) was added, and reacted at −25° C. for 4 hours. Then 100 ml water was added, the pH was adjusted to neutral with glacial acetic acid, 200 ml dichloromethane was added, stirred at room temperature for 2 hours, and then allowed to separate into layers. The organic layer was concentrated to dry under reduced pressure, and the residue was stirred with 120 ml tert-butyl methyl ether. Filtration and drying yielded target product (41.2 g, light yellow solid) with purity of 98.5% and yield of 91.0%.

Mass: m/z 334.1 [M−H]$^+$;

$^1$H NMR (400 MHz, CDCl$_3$) δ 7.81 (d, J=8.0 Hz, 1H), 7.61-7.57 (m, 2H), 7.02-6.99 (m, 2H), 6.85-6.82 (m, 2H), 2.54 (s, 3H), 1.35 (s, 12H).

Example 11

Preparation of pinacol 4-(4-cyano-phenoxy)-2-methylphenylborate (Compound of Formula III)

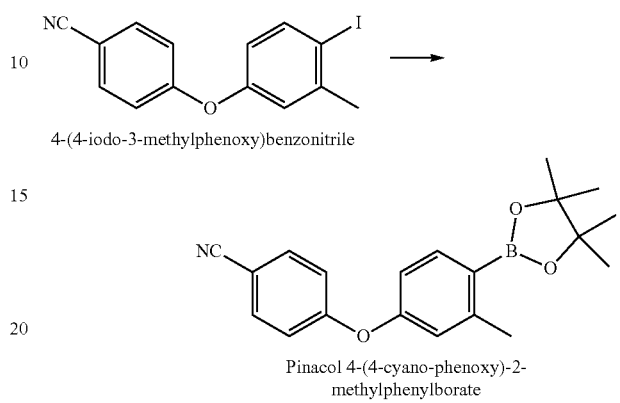

Pinacol 4-(4-cyano-phenoxy)-2-methylphenylborate

In the atmosphere of nitrogen, a flask was charged with 43 g 4-(4-iodo-3-methylphenoxy)benzonitrile (0.15 mol) prepared according to the process described in Example 4, 29.4 g potassium acetate (0.3 mol), 57.2 g bis(pinacolato)diboron (0.225 ml), 1.1 g Pd(DPPF)Cl$_2$ (0.0015 mol) and 300 ml 1,4-dioxane. The system was heated to 100° C. and kept at the temperature for 12 hours until the reaction was complete. After cooled to room temperature, 600 ml water was added, stirred in an ice-water bath for 2 hours, and filtrated under reduced pressure. The filter cake was dissolved in ethyl acetate, silica gel was added to absorb the palladium, and then filtrated. Distillation under reduced pressure yielded target product (46 g, white solid) with purity of 98.5% and yield of 92.0%.

Mass: m/z 334.1 [M−H]$^+$;

$^1$H NMR (400 MHz, CDCl$_3$) δ 7.81 (d, J=8.0 Hz, 1H), 7.61-7.57 (m, 2H), 7.02-6.99 (m, 2H), 6.85-6.82 (m, 2H), 2.54 (s, 3H), 1.35 (s, 12H).

Example 12

Preparation of 4-(4-cyano-phenoxy)-2-chloromethylbenzeneboronic acid (Compound of Formula II)

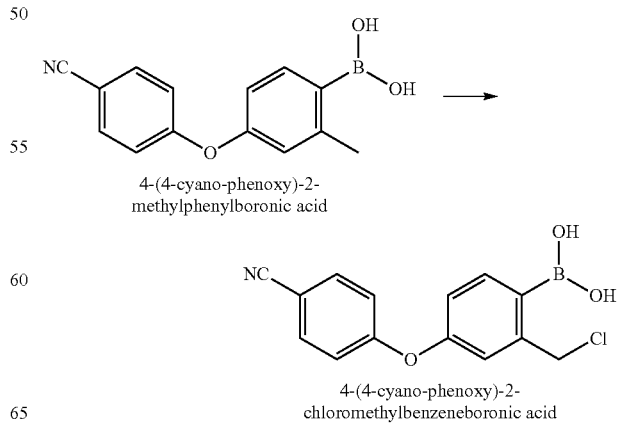

4-(4-cyano-phenoxy)-2-chloromethylbenzeneboronic acid

In the atmosphere of nitrogen, a flask was charged with 69 g 4-(4-cyano-phenoxy)-2-methylphenylboronic acid (0.26 mol) prepared in Example 8, and then with 400 ml chlorobenzene. The system was stirred to dissolve. A 110 W xenon lamp was turned on and settled about 2 cm away from the flask. 52 g N-chlorosuccinimide (0.39 mol) was added to the flask. The reaction lasted for 6 hours until it was complete. 300 ml water was added to the system, stirred for 15 minutes, and then allowed to separate into layers. The organic layer was concentrated to dry under reduced pressure. The residue was directly used in the next step.

Mass: m/z 286.1 [M–H]$^+$;

$^1$H NMR (400 MHz, d$_6$-DMSO) δ 7.79 (d, J=7.6 Hz, 2H), 7.70 (d, J=6.8 Hz, 1H), 7.16 (d, J=7.2 Hz, 2H), 6.88-6.94 (m, 2H), 4.57 (s, 2H), 4.23 (s, 2H).

Example 13

Preparation of diisobutyl 4-(4-cyano-phenoxy)-2-bromomethyl-benzeneborate (Compound of Formula II)

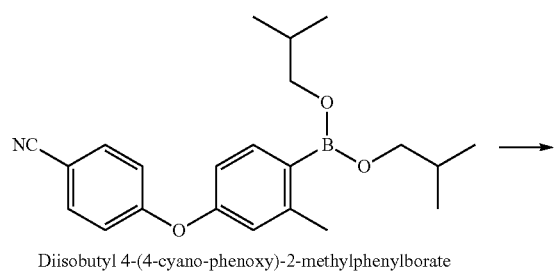

Diisobutyl 4-(4-cyano-phenoxy)-2-methylphenylborate

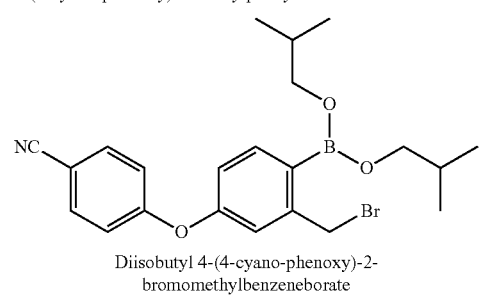

Diisobutyl 4-(4-cyano-phenoxy)-2-bromomethylbenzeneborate

In the atmosphere of nitrogen, a flask was charged with 95 g diisobutyl 4-(4-cyano-phenoxy)-2-methylphenylborate prepared in Example 9, and then with 400 ml chlorobenzene. The system was stirred to dissolve. 57 g N-bromosuccinimide (0.32 mol) and 2 g azobisisobutyronitrile were added sequentially. The system was heated to 60-65° C. and reacted for 2 hours. 100 ml of 5% sodium sulfite solution was added, stirred for about 15 minutes, and allowed to separate into layers. The aqueous layer was extracted with dichloromethane. The organic layers were combined and concentrated to dry. The residue was directly used in the next step.

Mass: m/z 442.0 [M–H]$^+$;

$^1$H NMR (400 MHz, CDCl$_3$) δ 7.86 (d, J=8.4 Hz, 1H), 7.66-7.60 (m, 2H), 7.14-6.98 (m, 4H), 4.77 (s, 2H), 3.86 (d, J=4.4 Hz, 4H), 1.38-1.24 (m, 2H), 0.96 (d, J=3.6 Hz, 12H).

Example 14

Preparation of Pinacol 4-(4-cyano-phenoxy)-2-bromomethylphenylborate (Compound of Formula II)

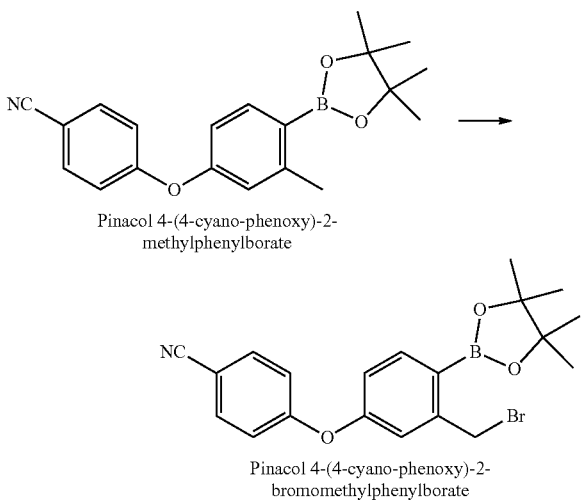

Pinacol 4-(4-cyano-phenoxy)-2-methylphenylborate

Pinacol 4-(4-cyano-phenoxy)-2-bromomethylphenylborate

In the atmosphere of nitrogen, a flask was sequentially charged with 41.2 g pinacol 4-(4-cyano-phenoxy)-2-methylphenylborate (0.123 mol) prepared in Example 10, and then with 200 ml chlorobenzene, 40.4 g 1,3-dibromo-5,5-dimethylhydantoin and 0.2 g azobisisobutyronitrile. The system was heated to 70-80° C. and kept the temperature for 5 hours until the reaction was complete. After cooled to 5-10° C., 150 ml of 5% sodium sulfite solution was added dropwise, and allowed to separate into layers. 100 ml water was added into the organic layer for washing, and allowed to separate into layers. The organic layer was concentrated under reduced pressure. The residue was stirred with 150 ml n-heptane. Filtration and drying yielded the target product (48.9 g, light yellow) with purity of 99.1% and yield of 96%.

Mass: m/z 412.0 [M–H]$^+$;

$^1$H NMR (400 MHz, CDCl$_3$) δ 7.87 (d, J=8.4 Hz, 1H), 7.63-7.61 (m, 2H), 7.10-7.02 (m, 3H), 6.96 (dd, J$_1$=2.4 Hz, J$_2$=8.4 Hz, 1H), 4.87 (s, 2H), 1.38 (s, 12H).

Example 15

Preparation of Crisaborole

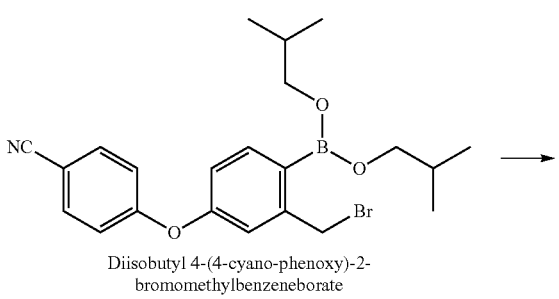

Diisobutyl 4-(4-cyano-phenoxy)-2-bromomethylbenzeneborate

-continued

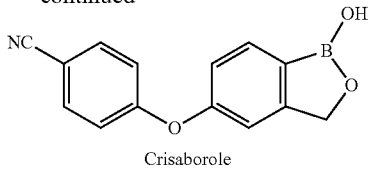

Crisaborole

In the atmosphere of nitrogen, a flask was charged with diisobutyl 4-(4-cyano-phenoxy)-2-bromomethylbenzeneborate prepared in Example 13 and 300 ml water. The system was heated to 40-50° C. under stirring. 300 ml 10% potassium hydroxide aqueous solution was added dropwise. The system reacted at 40-50° C. for 6 hours until the reaction was complete. 300 ml tert-butyl methyl ether was added to the system, stirred for 15 minutes and allowed to separate into layers. The organic layer was washed with 150 ml 5% potassium hydroxide aqueous solution. The aqueous layers were combined, the pH was adjusted to 2-4 with 10% hydrochloric acid solution. A white solid was obtained by filtration under reduced pressure, and then recrystallized with a mixed solvent of 200 ml ethyl acetate and 250 ml n-hexane. Filtration and drying yielded the target product (58 g) with purity of 99.6% and yield of 85%.

Mass: m/z 249.9 [M−H]+;
$^1$H NMR (400 MHz, $d_6$-DMSO) δ 9.22 (s, 1H), 7.87 (d, J=8.4 Hz, 2H), 7.81 (d, J=7.6 Hz, 1H), 7.17-7.09 (m, 4H), 4.98 (s, 2H).

Example 16

Preparation of Crisaborole

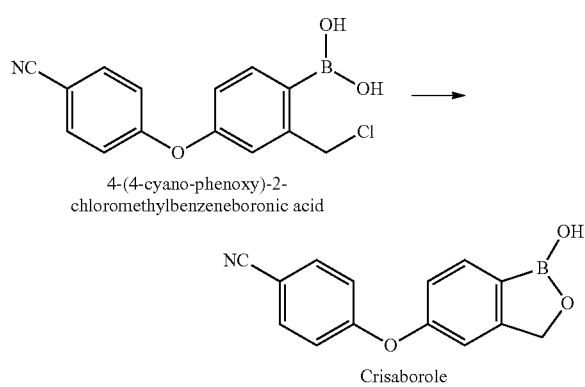

4-(4-cyano-phenoxy)-2-chloromethylbenzeneboronic acid

Crisaborole

In the atmosphere of nitrogen, a flask was charged with 4-(4-cyano-phenoxy)-2-chloromethylbenzeneboronic acid prepared in Example 12 and 300 ml water. The system was heated to 5060° C. under stirring. 300 ml triethylamine was added dropwise. The system reacted at 50-60° C. for 10 hours until the reaction was complete. 300 ml tert-butyl methyl ether was added to the system, stirred for 15 minutes and allowed to separate into layers. The organic layer was washed with 150 ml 5% sodium hydroxide aqueous solution. The aqueous layers were combined, the pH was adjusted pH to 2-4 with 10% hydrochloric acid solution. A white solid was obtained by filtration under reduced pressure, and then recrystallized in a mixed solvent of 300 ml ethyl acetate and 200 ml n-heptane. Filtration and drying yielded the target product (57 g) with purity of 99.7% and yield of 84%.

Mass: m/z 249.9 [M−H]+;
$^1$H NMR (400 MHz, $d_6$-DMSO) δ 9.22 (s, 1H), 7.87 (d J=8.4 Hz, 2H), 7.81 (d, J=7.6 Hz, 1H), 7.17-7.09 (m, 4H), 4.98 (s, 2H).

Example 17

Preparation of Crisaborole

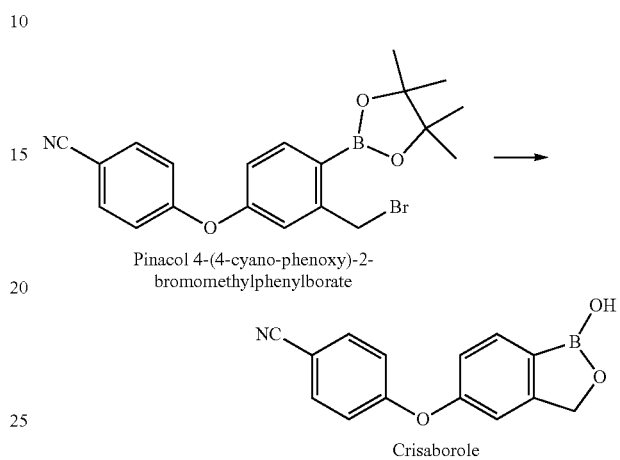

Pinacol 4-(4-cyano-phenoxy)-2-bromomethylphenylborate

Crisaborole

In the atmosphere of nitrogen, a flask was charged with 48.9 g pinacol 4-(4-cyano-phenoxy)-2-bromomethylbenzeneborate prepared in Example 14, 300 ml water and 33 g potassium hydroxide (0.59 mol). The system was heated to 55~65° C. under stirring, reacted at the temperature for 2 hours until the reaction was complete. 300 m tert-butyl methyl ether was added to the system, stirred for 15 minutes and allowed to separate into layers. The organic layer was washed with 150 ml 5% sodium hydroxide aqueous solution. The aqueous layers were combined, the pH was adjusted to 2~4 with 10% hydrochloric acid solution. A white solid was obtained by filtration under reduced pressure, and then recrystallized in a mixed solution of 200 ml ethyl acetate and 120 ml n-heptane. Filtration and drying yielded the target product (26.66 g) with purity of 99.8% and yield of 90.0%.

Mass: m/z 249.9 [M−H]+;
$^1$H NMR (400 MHz, $d_6$-DMSO) δ 9.22 (s, 1H), 7.87 (d, J=8.4 Hz, 2H), 7.81 (d, J=7.6 Hz, 1H), 7.17-7.09 (m, 4H), 4.98 (s, 2H).

In conclusion, the present invention provides a new method for preparing Crisaborole. The method has the advantages of mild reaction conditions, good safety of reagents and raw materials, high yield and product purity. Those skilled in the art can make some improvements and transformations under the spirit of the present invention. These improvements and transformations are also within the scope of the present invention.

The invention claimed is:
1. A method for preparing Crisaborole of Formula I:

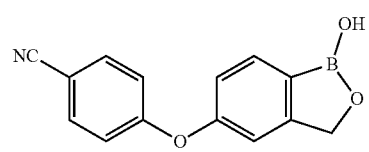

I comprising the steps of:

Step 1, contacting m-methylphenol of Formula VII

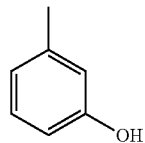

with a halogenating reagent in organic solvent A to give 4-halo-3-methylphenol of Formula VI

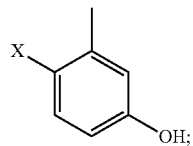

Step 2, coupling 4-halo-3-methylphenol obtained in Step 1 with 4-halo-benzonitrile of Formula V in organic solvent B under alkaline conditions to give 4-(4-halo-3-methylphenoxy)benzonitrile of Formula IV

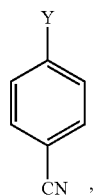

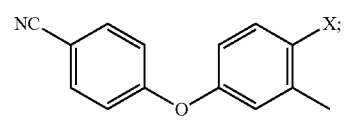

Step 3, subjecting 4-(4-halo-3-methylphenoxy)benzonitrile obtained in Step 2 to a halogen-metal exchange reaction in organic solvent C, and then to a reaction with a borate to give 4-(4-cyano-phenoxy)-2-methylphenylboronic acid or ester thereof of Formula III; or contacting 4-(4-halo-3-methylphenoxy) benzonitrile obtained in Step 2 with a borate in organic solvent D under alkaline condition to give 4-(4-cyano-phenoxy)-2-methylphenylboronic acid or ester thereof of Formula III via a metal-catalyzed reaction

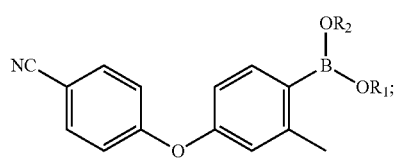

Step 4, contacting 4-(4-cyano-phenoxy)-2-methylphenylboronic acid or ester thereof obtained in Step 3 with a halogenating reagent in organic solvent E to give 4-(4-cyano-phenoxy)-2-halomethylphenylboronic acid or ester thereof of Formula II

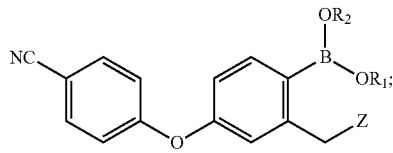

Step 5, subjecting 4-(4-cyano-phenoxy)-2-halomethylphenyl-boronic acid or ester thereof obtained in Step 4 to a closing ring reaction under alkaline condition to give Crisaborole;

wherein, X and Z are each independently selected from Cl, Br and I; Y is selected from F, Cl, Br and I; $R_1$ and $R_2$ are each independently selected from H and $C_1$~$C_6$ alkyl, or $R_1$ and $R_2$ form a substituted or unsubstituted five-membered or six-membered saturated or unsaturated heterocycle with O and B to which they are attached respectively.

2. The method according to claim 1, wherein, $R_1$=$R_2$=H or $C_1$~$C_4$ linear or branched alkyl; or $R_1$ and $R_2$ form a substituted or unsubstituted five-membered or six-membered saturated heterocycle with O and B to which they are attached respectively.

3. The method according to claim 1, wherein, in the Step 1, the halogenating reagent is one or more selected from the group consisting of $HBr/H_2O_2$, $HBr/R_3SOR_4$, N-bromosuccinimide, N-chlorosuccinimide, N-iodosuccinimide, dibromoisocyanuric acid, 1,3-dichloro-5,5-dimethylhydantoin, 1,3-dibromo-5,5-dimethylhydantoin, bromine and iodine;

wherein, $R_3$ and $R_4$ are each independently selected from $C_1$~$C_6$ alkyl, aryl and benzyl.

4. The method according to claim 1, wherein, in the Step 2, the organic solvent B is one or more selected from polar aprotic solvents, aromatic hydrocarbon solvents, ketone solvents, ester solvents and ether solvents.

5. The method according to claim 1, wherein, in the Step 2, the molar ratio of 4-halo-3-methylphenol to 4-halo-benzonitrile is 0.5:1~1:4.

6. The method according to claim 1, wherein, the Step 3 is carried out under the protection of an inert gas.

7. The method according to claim 1, wherein, in the Step 3, the metal-catalyzed reaction is carried out in the presence of a palladium-containing metal catalyst.

8. The method according to claim 1, wherein, the Step 4 is carried out under illumination conditions or in the presence of an initiator wherein, the illumination condition is a xenon lamp, a deuterium lamp, a mercury lamp, an ultraviolet lamp, a carbon arc lamp or a fluorescent lamp as the light source; and wherein, the initiator is one selected from the group consisting of benzoyl peroxide, di-tert-butyl peroxide, tert-butyl hydroperoxide, azobisisobutyronitrile and 1,2-dibromoethane.

9. The method according to claim 1, wherein, in the Step 4, the halogenating reagent is one or more selected from the group consisting of N-bromosuccinimide, N-chlorosuccinimide, N-iodosuccinide, dibromoisocyanuric acid, 1,3-dichloro-5,5-dimethylhydantoin, 1,3-dibromo-5,5-dimethylhydantoin, chlorine, bromine and iodine.

10. The method according to claim 1, wherein, in the Step 5, the alkaline condition is in the presence of an inorganic base or an organic base.

11. The method according to claim 1, wherein, in the Step 1, the molar ratio of the halogenating reagent to m-methylphenol is 0.5:1~4:1.

12. The method according to claim 1, wherein, in the Step 1, the reaction is carried out in the presence or absence of an acid.

13. The method according to claim 1, wherein, in the Step 1, the reaction temperature is −10° C.~80° C.

14. The method according to claim 1, wherein, in the Step 1, the organic solvent A is one or more selected from the group consisting of ethyl acetate, dichloromethane, trichloromethane, carbon tetrachloride, nitromethane, tetrahydrofuran, chlorobenzene, 1,4-dioxane and acetonitrile.

15. The method according to claim 1, wherein, the reaction temperature in the Step 2 is 50° C.~130° C.

16. The method according to claim 1, wherein, in the Step 3, the molar ratio of 4-(4-halo-3-methylphenoxy) benzonitrile to the borate is 1:0.6~1:4.

17. The method according to claim 1, wherein, in the Step 3, the halogen-metal exchange reaction is carried out in the presence of a metal Grignard reagent, wherein, the molar ratio of 4-(4-halo-3-methylphenoxy) benzonitrile to the metal Grignard reagent is 1:0.6~1:4.

18. The method according to claim 1, wherein, the reaction temperature in the halogen-metal exchange reaction is −40° C. to room temperature.

19. The method according to claim 1, wherein, the reaction solvent C is selected from ether solvents or hydrocarbon solvents; wherein, the ether solvent is one or more selected from the group consisting of ether, tetrahydrofuran, 1,4-dioxane and methyl tert-butyl ether; the hydrocarbon solvent is one or more selected from the group consisting of toluene, xylene, n-hexane, cyclohexane and heptane.

20. The method according to claim 1, wherein, in the Step 3, if the halogen-metal exchange reaction is performed, the borate is one or more selected from the group consisting of trimethyl borate, triethyl borate, triisopropyl borate, tributyl borate, triisobutyl borate, tripentyl borate and bis(pinacolato)diboron.

21. The method according to claim 7, wherein, the palladium-containing metal catalyst is Pd(PPh3)4 or Pd2(dba)3; or the palladium-containing metal catalyst is composed of a palladium precursor and a phosphine ligand; the palladium precursor is one selected from the group consisting of PdCl2, PdBr2, PdI2, Pd(OAc)2 and allylpalladium chloride dimer; the phosphine ligand is one selected from the group consisting of $PPh_3$, P(tBu)3, PCy3, Xant Phos, DPPB, DPPP, DPPHex and DPPF and other monophosphine ligands or diphosphine ligands.

22. The method according to claim 7, wherein, the molar ratio of 4-(4-halo-3-methylphenoxy)benzonitrile to the metal catalyst is 1:0.002~1: 0.05.

23. The method according to claim 1, wherein, the base in the metal-catalyzed reaction is selected from an organic base and an inorganic base.

24. The method according to claim 1, wherein, the solvent D in the metal-catalyzed reaction is one or more selected from polar aprotic solvents, aromatic hydrocarbon solvents, ketone solvents, ester solvents and ether solvents.

25. The method according to claim 1, wherein, the reaction temperature in the metal-catalyzed reaction is 80° C.18 120° C.

26. The method according to claim 8, wherein, the Step 4 is carried out in the presence of the initiator under the protection of an inert gas.

27. The method according to claim 1, wherein, in the Step 4, the molar ratio of 4-(4-cyano-phenoxy)-2-methylphenylboronic acid to the halogenating reagent is 1:0.6~1:4.

28. The method according to claim 1, wherein, in the Step 4, the organic solvent E is one or more selected from the group consisting of dichloromethane, trichloromethane, carbon tetrachloride, nitromethane, tetrahydrofuran, chlorobenzene, 1,4-dioxane and acetonitrile.

29. The method according to claim 1, wherein, in the Step 4, the reaction temperature is 50° C.~100° C.

30. The method according to claim 1, wherein, in the Step 5, the reaction temperature is 30° C.~80° C.

* * * * *

UNITED STATES PATENT AND TRADEMARK OFFICE
CERTIFICATE OF CORRECTION

PATENT NO. : 11,214,581 B2
APPLICATION NO. : 17/000072
DATED : January 4, 2022
INVENTOR(S) : Zhengwei Pang et al.

It is certified that error appears in the above-identified patent and that said Letters Patent is hereby corrected as shown below:

In the Claims

Column 24, Lines 2-3, Claim 21     delete "Pd(PPh3)4 or Pd2(dba)3;" and
insert -- $Pd(PPh_3)_4$ or $Pd_2(dba)_3$; --

Column 24, Line 6, Claim 21     delete "PdCl2, PdBr2, PdI2, Pd(OAc)2" and
insert -- $PdCl_2$, $PdBr_2$, $PdI_2$, $Pd(OAc)_2$ --

Column 24, Line 8, Claim 21     delete "P(tBu)3, PCy3," and
insert -- $P(tBu)_3$, $PCy_3$, --

Column 24, Line 8, Claim 21     delete "Xant Phos," and
insert -- XantPhos, --

Column 24, Line 23, Claim 25     delete "80° C.18" and
insert -- 80° C.~ --

Signed and Sealed this
Twenty-fourth Day of January, 2023

Katherine Kelly Vidal
*Director of the United States Patent and Trademark Office*